United States Patent
Horesh et al.

(10) Patent No.: US 11,386,507 B2
(45) Date of Patent: Jul. 12, 2022

(54) TENSOR-BASED PREDICTIONS FROM ANALYSIS OF TIME-VARYING GRAPHS

(71) Applicants: International Business Machines Corporation, Armonk, NY (US); TRUSTEES OF TUFTS COLLEGE, Medford, MA (US); Ramot at Tel-Aviv University Ltd., Tel-Aviv (IL)

(72) Inventors: Lior Horesh, North Salem, NY (US); Osman Asif Malik, Boulder (CO); Shashanka Ubaru, Ossining, NY (US); Misha E. Kilmer, Medfield, MA (US); Haim Avron, Tel Aviv (IL)

(73) Assignees: INTERNATIONAL BUSINESS MACHINES CORPORATION, Armonk, NY (US); Trustees of Tufts College, Medford, MA (US); RAMOT AT TEL-AVIV UNIVERSITY LTD., Tele-Aviv (IL)

( * ) Notice: Subject to any disclaimer, the term of this patent is extended or adjusted under 35 U.S.C. 154(b) by 542 days.

(21) Appl. No.: 16/579,454

(22) Filed: Sep. 23, 2019

(65) Prior Publication Data
US 2021/0090182 A1 Mar. 25, 2021

(51) Int. Cl.
*G06Q 50/00* (2012.01)
*G06F 17/16* (2006.01)
(Continued)

(52) U.S. Cl.
CPC ......... *G06Q 50/01* (2013.01); *G06F 16/9024* (2019.01); *G06F 17/16* (2013.01); *G06N 20/00* (2019.01)

(58) Field of Classification Search
CPC ..... G06Q 50/01; G06F 16/9024; G06F 17/16; G06F 17/10; G06N 20/00; G06N 3/04; G06N 3/08
See application file for complete search history.

(56) References Cited

U.S. PATENT DOCUMENTS

| 7,660,705 B1 | 2/2010 | Meek et al. |
| 9,406,021 B2 | 8/2016 | Mojsilovic et al. |

(Continued)

FOREIGN PATENT DOCUMENTS

| CN | 106055627 A | 10/2016 |
| CN | 109754605 A | 5/2019 |

OTHER PUBLICATIONS

Braman et al., "Third Order Tensors as Operators on Matrices: a Theoretical and Computational Framework With Applications in Imaging", 2010, 24 pages.

(Continued)

*Primary Examiner* — Michael Won
(74) *Attorney, Agent, or Firm* — Cantor Colburn LLP; Stosch Sabo

(57) ABSTRACT

A computer-implemented method for analyzing a time-varying graph is provided. The time-varying graph includes nodes representing elements in a network, edges representing transactions between elements, and data associated with the nodes and the edges. The computer-implemented method includes constructing, using a processor, adjacency and feature matrices describing each node and edge of each time-varying graph for stacking into an adjacency tensor and describing the data of each time-varying graph for stacking into a feature tensor, respectively. The adjacency and feature tensors are partitioned into adjacency and feature training tensors and into adjacency and feature validation tensors, respectively. An embedding model and a prediction model are created using the adjacency and feature training tensors. The embedding and prediction models are validated using the adjacency and feature validation tensors to identify an optimized embedding-prediction model pair.

22 Claims, 9 Drawing Sheets

(51) Int. Cl.
*G06N 20/00* (2019.01)
*G06F 16/901* (2019.01)

(56) References Cited

U.S. PATENT DOCUMENTS

| | | | |
|---|---|---|---|
| 10,366,324 B2 | 7/2019 | Riley et al. | |
| 2014/0181171 A1* | 6/2014 | Dourbal | G06F 17/16 |
| | | | 708/607 |
| 2018/0082189 A1* | 3/2018 | Cormier | G06F 21/6218 |
| 2019/0095806 A1 | 3/2019 | Canedo et al. | |
| 2019/0132344 A1 | 5/2019 | Lem et al. | |
| 2019/0272468 A1* | 9/2019 | Feinberg | G06N 3/0481 |
| 2021/0081804 A1* | 3/2021 | Stojevic | G06N 3/088 |

OTHER PUBLICATIONS

Kilmer et al., "Third-Order Tensors as Operators on Matrices: A Theoretical and Computational Framework with Applications in Imaging", 2013, 26 pages.

Kilmer et al., "Factorization strategies for third-order tensors", Linear Algebra and its Application, 2010, 18 pages.

Manessi et al., "Dynamic Graph Convolutional Networks" arXiv:1704.06199v1 [cs.LG] Apr. 20, 2017, 16 pages.

Pareja et al., "EvolveGCN: Evolving Graph Convolutional Networks for Dynamic Graphs" arXiv:1902.10191v1 [cs.LG] Feb. 26, 2019, 8 pages.

Seo et al., "Structured Sequence Modeling With Graph Convolutional Recurrent Networks", arXiv:1612.07659v1 [stat.ML] Dec. 22, 2016, 10 pages.

Kernfeld et al., "Tensor-tensor products with invertible linear transforms", Linear Algebra and its Applications 485 (2015) 545-570.

Wang et al., "Dynamic graph cnn for learning on point clouds", ArXIV, 2018, 13 pages.

Newman et al., "Stable Tensor Neural Networks for Rapid Deep Learning", ArXIV, 2018, 20 pages.

Kipf et al., "Semi-Supervised Classification With Graph Convolutional Networks", ArXIV, 2017, 14 pages.

* cited by examiner

| Sender | Receiver | Rating | Timestamp |
|---|---|---|---|
| 1 | 2 | 1 | 1 |
| 1 | 3 | 1 | 7 |
| 2 | 3 | 1 | 9 |
| 1 | 2 | 1 | 12 |
| 3 | 1 | 1 | 13 |
| 2 | 1 | 1 | 21 |
| 3 | 2 | 1 | 27 |
| 3 | 2 | -1 | 29 |

FIG. 3

| Participant | Average no. transactions/month | Wealth | Gender | Country |
|---|---|---|---|---|
| 1 | 5 | 100 | 1 | 17 |
| 2 | 181 | 5 | 1 | 1 |
| 3 | 21 | 110 | 0 | 3 |

FIG. 4

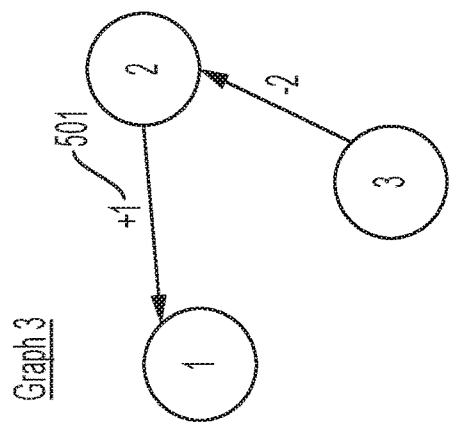
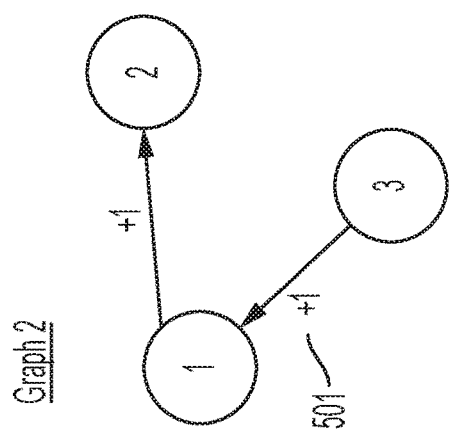
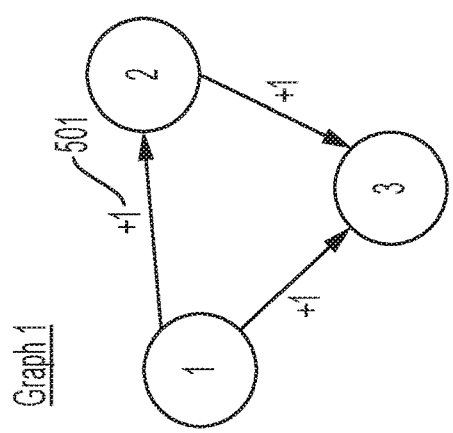
FIG. 5

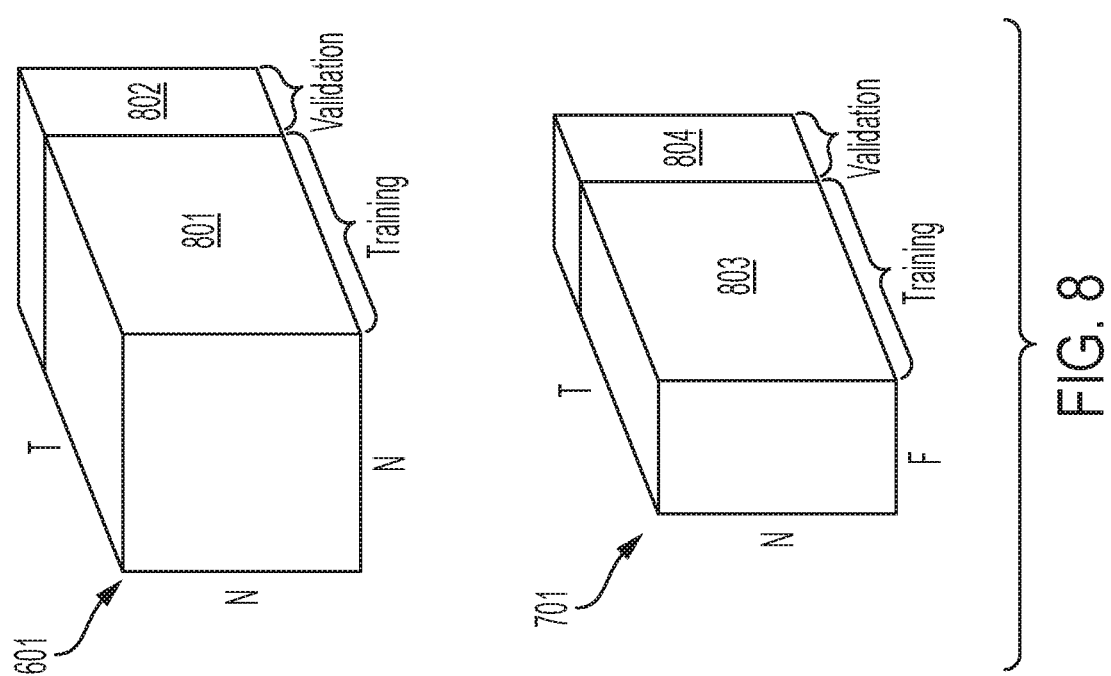

TENSOR-BASED PREDICTIONS FROM ANALYSIS OF TIME-VARYING GRAPHS

BACKGROUND

The present invention generally relates to a prediction system, and more specifically, to a system for generating a tensor-based prediction from a time-varying graph.

Graphs are structures amounting to a set of objects and associations and can be analyzed using tools devised for that purpose. In certain cases, graphs can effectively encode complex structures that are inherent to high-dimensional datasets of networks so that the graphs can be studied to develop knowledge about the datasets. Motivations for doing so can include, for example, the recognition that, by construction, many datasets possess graph structures and inferring underlying topologies from the graph structures often provides for deeper insights into inner-workings of complex networks, such as recommendation, biological, social and financial networks.

SUMMARY

Embodiments of the present invention are directed to a computer-implemented method for analyzing time-varying graphs. The time-varying graphs each include nodes representing elements in a network, edges representing transactions between elements and data associated with the nodes and the edges. The computer-implemented method includes constructing adjacency and feature matrices describing each node and edge of each time-varying graph for stacking into an adjacency tensor and describing the data of each time-varying graph for stacking into a feature tensor, respectively. The computer-implemented method further includes partitioning the adjacency and feature tensors into adjacency and feature training tensors and into adjacency and feature validation tensors, respectively and creating an embedding model and a prediction model using the adjacency and feature training tensors. The computer-implemented method further includes validating the embedding and prediction models using the adjacency and feature validation tensors to identify an optimized embedding-prediction model pair.

In accordance with additional or alternative embodiments, the network includes a social network in which the nodes and the edges of each time-varying graph respectively represent individuals and relationships between the individuals and the prediction of the optimized embedding-prediction model pair includes predicted qualities of the relationships between individuals of the social network at a future time.

In accordance with additional or alternative embodiments, the computer-implemented method further includes computing the predictions of qualities of relationships between the individuals at the future time using the optimized embedding-prediction pair and preemptively managing computing resources relative to the relationships at the future time in accordance with the predicted qualities.

In accordance with additional or alternative embodiments, the network includes a business network in which the nodes and the edges of each time-varying graph respectively represent entities and transactions between the entities and the prediction of the optimized embedding-prediction model pair comprises predicted trustworthiness of transactions between entities of the business network at a future time.

In accordance with additional or alternative embodiments, the computer-implemented method further includes computing the predicted trustworthiness of transactions between entities of the business network at the future time using the optimized embedding-prediction pair and preemptively authorizing or blocking the transactions at the future time in accordance with the predicted trustworthiness.

Embodiments of the present invention are directed to a method for analyzing time-varying graphs. The time-varying graphs each include nodes representing elements in a network, edges representing transactions between elements and data associated with the nodes and the edges. The method includes constructing adjacency and feature matrices describing each node and edge of each time-varying graph for stacking into an adjacency tensor and describing the data of each time-varying graph for stacking into a feature tensor, respectively. The method further includes partitioning the adjacency and feature tensors into adjacency and feature training tensors and into adjacency and feature validation tensors, respectively and creating an embedding model and a prediction model using the adjacency and feature training tensors. The method further includes validating the embedding and prediction models using the adjacency and feature validation tensors to identify an optimized embedding-prediction model pair.

In accordance with additional or alternative embodiments, the network includes a social network in which the nodes and the edges of each time-varying graph respectively represent individuals and relationships between the individuals and the prediction of the optimized embedding-prediction model pair includes predicted qualities of the relationships between individuals of the social network at a future time.

In accordance with additional or alternative embodiments, the method further includes computing the predictions of qualities of relationships between the individuals at the future time using the optimized embedding-prediction pair and preemptively managing computing resources relative to the relationships at the future time in accordance with the predicted qualities.

In accordance with additional or alternative embodiments, the network includes a business network in which the nodes and the edges of each time-varying graph respectively represent entities and transactions between the entities and the prediction of the optimized embedding-prediction model pair comprises predicted trustworthiness of transactions between entities of the business network at a future time.

In accordance with additional or alternative embodiments, the method further includes computing the predicted trustworthiness of transactions between entities of the business network at the future time using the optimized embedding-prediction pair and preemptively authorizing or blocking the transactions at the future time in accordance with the predicted trustworthiness.

Embodiments of the present invention are directed to a computer program product. The computer program product includes a computer readable storage medium having program instructions embodied therewith. The program instructions are executable by a processor to cause the processor to perform a method of analyzing time-varying graphs respectively including nodes representing elements in a network, edges representing transactions between elements and data associated with the nodes and the edges. The method includes constructing adjacency and feature matrices describing each node and edge of each time-varying graph for stacking into an adjacency tensor and describing the data of each time-varying graph for stacking into a feature tensor, respectively. The method further includes partitioning the adjacency and feature tensors into adjacency and feature training tensors and into adjacency and feature validation tensors, respectively and creating an embedding model and a prediction model using the adjacency and feature training tensors. The method further includes validating the embedding and prediction models using the adjacency and feature validation tensors to identify an optimized embedding-prediction model pair.

In accordance with additional or alternative embodiments, the network includes a social network in which the nodes and the edges of each time-varying graph respectively represent individuals and relationships between the individuals and the prediction of the optimized embedding-prediction model pair includes predicted qualities of the relationships between individuals of the social network at a future time.

In accordance with additional or alternative embodiments, the method further includes computing the predictions of qualities of relationships between the individuals at the future time using the optimized embedding-prediction pair and preemptively managing computing resources relative to the relationships at the future time in accordance with the predicted qualities.

In accordance with additional or alternative embodiments, the network includes a business network in which the nodes and the edges of each time-varying graph respectively represent entities and transactions between the entities and the prediction of the optimized embedding-prediction model pair comprises predicted trustworthiness of transactions between entities of the business network at a future time.

In accordance with additional or alternative embodiments, the method further includes computing the predicted trustworthiness of transactions between entities of the business network at the future time using the optimized embedding-prediction pair and preemptively authorizing or blocking the transactions at the future time in accordance with the predicted trustworthiness.

Embodiments of the present invention are directed to a computer-implemented method for analyzing time-varying graphs. The time-varying graphs each include nodes representing individuals in a social network, edges representing friendships between individuals and data associated with the nodes and the edges. The computer-implemented method includes constructing adjacency and feature matrices describing each node and edge of each time-varying graph for stacking into an adjacency tensor and describing the data of each time-varying graph for stacking into a feature tensor, respectively. The computer-implemented method further includes partitioning the adjacency and feature tensors into adjacency and feature training tensors and into adjacency and feature validation tensors, respectively and creating an embedding model and a prediction model using the adjacency and feature training tensors. The computer-implemented method further includes validating the embedding and prediction models using the adjacency and feature validation tensors to identify an optimized embedding-prediction model pair. In addition, the computer-implemented method also includes computing the predictions of qualities of relationships between the individuals at the future time using the optimized embedding-prediction pair and preemptively managing computing resources relative to the relationships at the future time in accordance with the predicted qualities.

Embodiments of the present invention are directed to a computer-implemented method for analyzing time-varying graphs. The time-varying graphs each include nodes representing entities in a business network, edges representing transactions between entities and data associated with the nodes and the edges. The computer-implemented method includes constructing adjacency and feature matrices describing each node and edge of each time-varying graph for stacking into an adjacency tensor and describing the data of each time-varying graph for stacking into a feature tensor, respectively. The computer-implemented method further includes partitioning the adjacency and feature tensors into adjacency and feature training tensors and into adjacency and feature validation tensors, respectively and creating an embedding model and a prediction model using the adjacency and feature training tensors. The computer-implemented method further includes validating the embedding and prediction models using the adjacency and feature validation tensors to identify an optimized embedding-prediction model pair. In addition, the computer-implemented method also includes computing the predicted trustworthiness of transactions between entities at the future time using the optimized embedding-prediction pair and preemptively authorizing or blocking the transactions at the future time in accordance with the predicted trustworthiness.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 3 is a graphical display of historical adjacency data from which time-varying graphs can be derived in accordance with embodiments of the present invention;

FIG. 4 is a graphical display of historical feature data from which time-varying graphs can be derived in accordance with embodiments of the present invention;

FIG. 5 is a diagram illustrating the generation of adjacency matrices in accordance with embodiments of the present invention;

FIG. 8 depicts the partitioning of the adjacency and feature tensors of FIGS. 6 and 7 into respective training and validation tensors in accordance with embodiments of the present invention;

Figure 1:
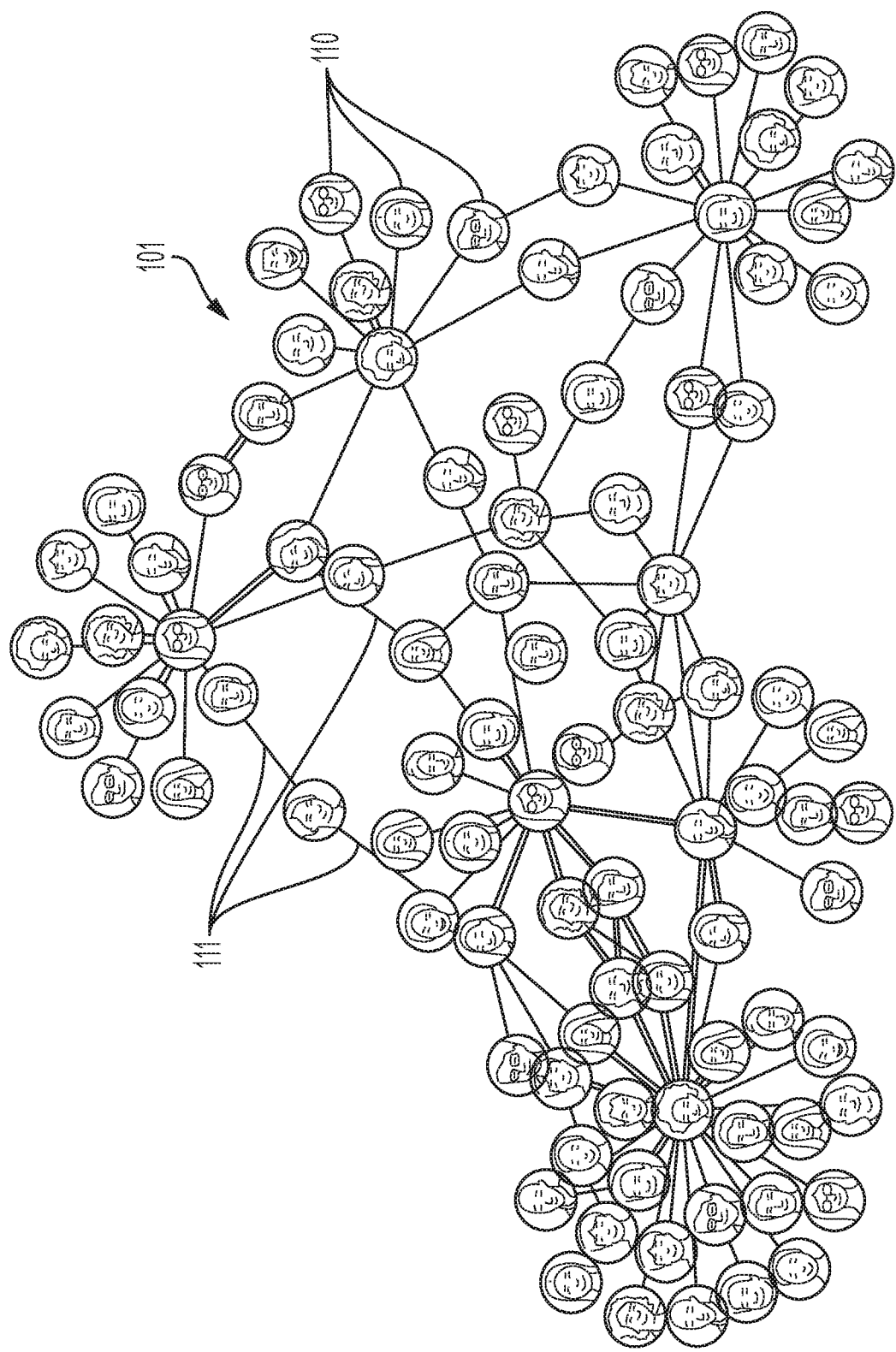
FIG. 1 illustrates a schematic diagram of a graph of a social network in accordance with embodiments of the present invention.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Known methods of using tensor graph neural networks (GNNs) as tools that handle time-varying graphs lack efficiency, and capturing correlations over time using simple GNNs is challenging. In particular, there are no known approaches to using GNNs to explore time-varying graph structures by employing tensor algebra to correlate dynamic evolution in a time dimension. Hence, one or more embodiments of the present invention provide tensor GNNs for generating predictions on time-varying graphs. A representation of data in a time-varying graph structure is constructed for use in different classification and prediction tasks. The time-varying graph structure includes a set of nodes and a set of edges that each extend between a pair of nodes. As an example, in a time-varying graph of a social network, the nodes can represent individuals and the edges can represent pairwise friendships between these individuals. Each node has node data associated with it. The time-varying graph and the node data can change over time. By processing the time-varying graph structure and the associated node data, a representation of the original data can be used to classify the nodes or edges at different time points.

Embodiments of the invention can be applied to a variety of dynamic or time-varying graph structures, which can be created to illustrate a network topology of a given network. For a social network, a time-varying graph can represent each individual in that social network as well as the friendships between each individual and other individuals and characteristics of those friendships. For corporate and financial networks, a time-varying graph can represent each corporate and financial entity in a given network, how those corporate and financial entities are interrelated and the reputational trustworthiness of each corporate and financial entity. A time-varying graph of a neural activity network can represent various neural activities in a brain or processing system as well as the strengths and accuracies of those activities and a time-varying graph of a traffic network can represent each vehicle in the traffic network as well as its direction and speed.

One or more embodiments of the present invention address one or more of the above-described shortcomings of the prior art by providing for a method of creating time-varying graphs from historical data of a given network and analyzing the time-varying graphs so that embedding and prediction models can be generated, validated and used to make predictions about the network.

Figure 2:
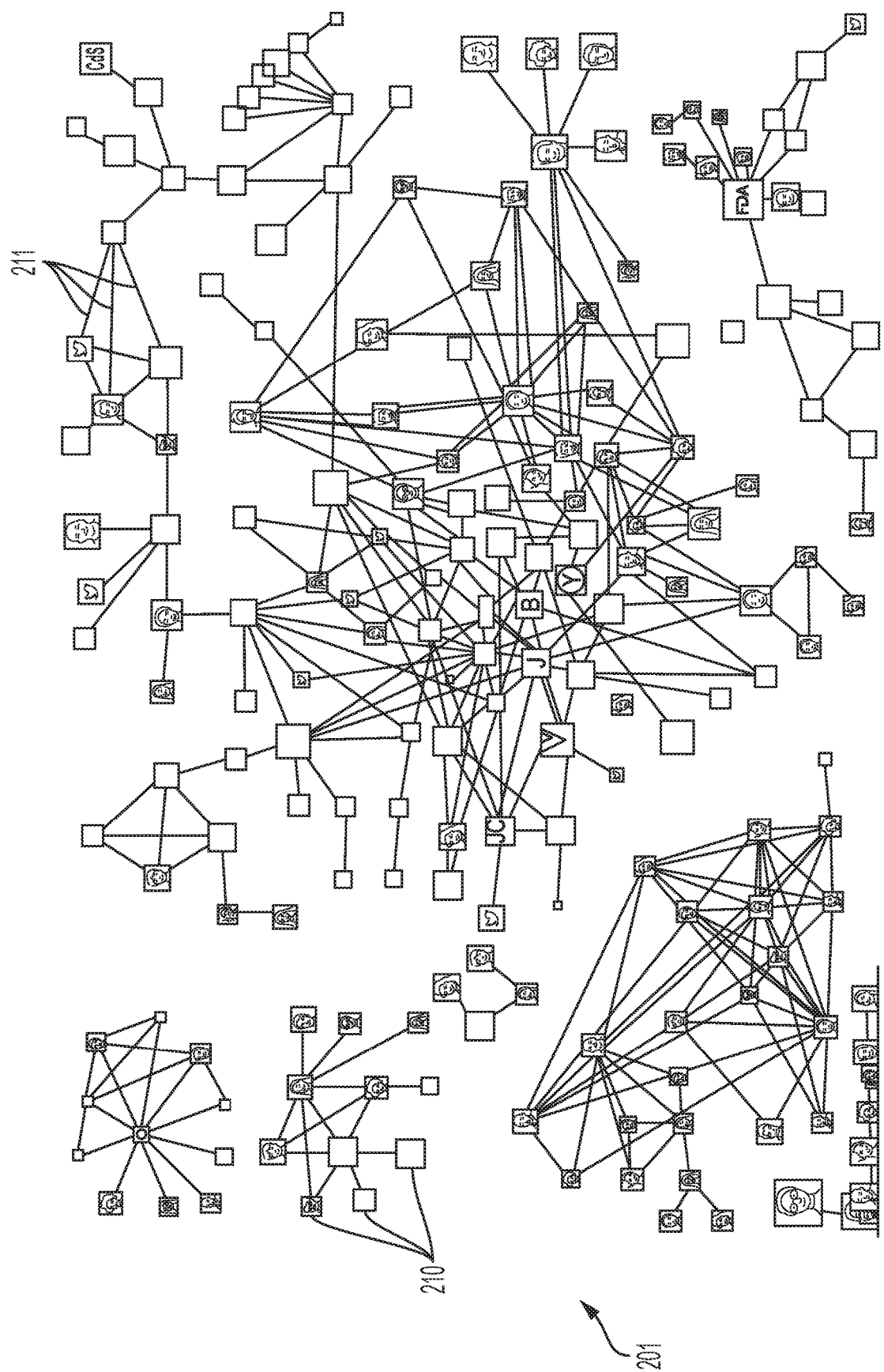
FIG. 2 illustrates a schematic diagram of a graph of a business network in accordance with embodiments of the present invention.

Turning now to FIGS. 1 and 2, an exemplary time-varying graph 101 (see FIG. 1) of a social network and an exemplary time-varying graph 201 (see FIG. 2) of a business network are provided.

As shown in FIG. 1, the time-varying graph 101 of the social network is supported by one or more computing resources, allows multiple individuals to connect with each other by making friendships, and allows those individuals to communicate with each other during the lifetime of those friendships. As such, the time-varying graph 101 of the social network includes nodes 110 that are representative of each of the individuals in the social network, edges 111 that are representative of the friendships between the individuals, and data associated with various qualities of the friendships. The data can include a description of each of the individuals as well as a description of a bullying incident, for example. Over time, the time-varying graph 101 of the social network will change as new individuals become part of the social network while other individuals leave and as friendships change.

As shown in FIG. 2, the time-varying graph 201 of the business network is supported by one or more computing resources, allows multiple entities to connect with each other and also allows those entities to execute transactions with each other. As such, the time-varying graph 201 of the business network includes nodes 210 that are representative of each of the entities in the business network, edges 211 that are representative of the transactions between the entities and data associated with various qualities of the transactions. The data can include a description of each of the transactions between entities as well as a trustworthiness measure of each of the transactions, for example. Over time, the time-varying graph 201 of the business network will change as new entities become part of the business network while other entities leave and as transactions commence and end or otherwise change.

It is to be understood that while the time-varying graphs 101 and 201 of the social network and the business network are provided in FIGS. 1 and 2, other types of networks are possible and can be represented by time-varying graphs. It is to be further understood that the following description will generally relate to an analysis of a time-varying graph like (but different from) the time-varying graph 201 of the business network so as to develop embedding and prediction models that can be used to make predictions about the business network at a future time. This is being done for the purposes of clarity and brevity and is not limiting of the overall scope of the application in any way.

With reference to FIGS. 3-5, snapshots of historical data can be taken so that the time-varying graphs 101 and 201 for various points in time can be generated. An example of such historical data is shown in FIGS. 3 and 4. A time-varying graph is constructed from the historical data by choosing some time as a "bucket size," for example 10. Then, transactions in a business network with a timestamp in the 1-10, 11-20 or 21-30 time buckets, etc., are grouped together. From each such group, a snapshot of the time-varying graph can be created (see, e.g., the time-varying graph 201 of FIG. 2).

In the example of FIG. 3, each time-varying graph includes three nodes since there are three users in the historical data. If there was a transaction from user m to user n during a certain time bucket (e.g., the 1-10 time bucket), an edge or arrow pointing from node m to node n is added in the corresponding time-varying graph (see FIG. 5, where graph 1 corresponds to transactions during the 1-10 time bucket, and so on). That edge or arrow is assigned a label

501 (see FIG. 5), which is the sum of the ratings given by user m when sending money to user n during the time bucket in question. This is why the edge between node three and node two in graph 3 of FIG. 5 has a −2 label 501: the two negative scores by node three when sending money to node two during the 21-30 time bucket are added together. In the example of FIG. 4, the data of each time-varying graph can again include three nodes for the three users as well as feature data of the three users.

For a graph of N nodes, an adjacency matrix 502 is a table with N rows and N columns. The entry on rows m and column n is "1" if there is an edge pointing from node m to node n in the graph, and "0" otherwise. The adjacency matrices 502 for the three graphs are shown in the bottom portion of FIG. 5. A feature matrix 503 (see FIG. 6) is a table with N rows and M columns where the entries are consistent with the data of FIG. 4.

Figure 7:
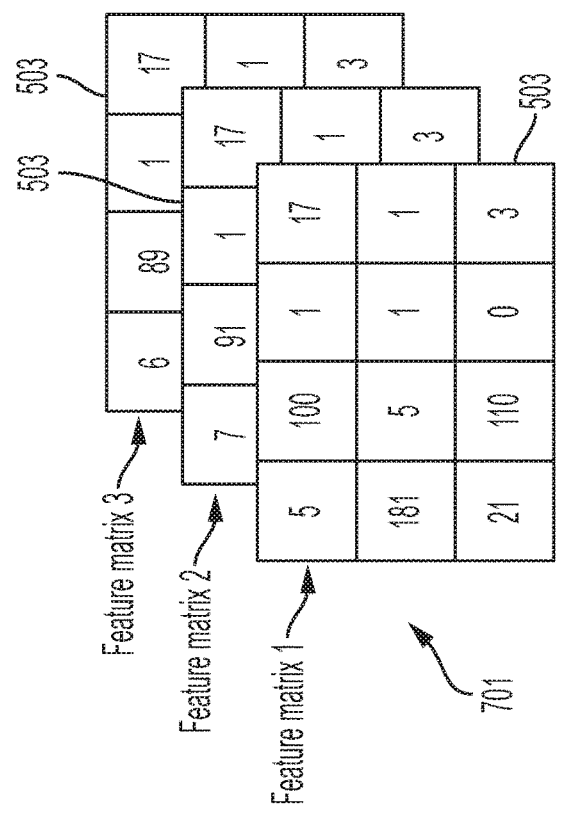
FIG. 7 is a diagram illustrating the stacking of feature matrices into a feature tensor in accordance with embodiments of the present invention.
Figure 6:
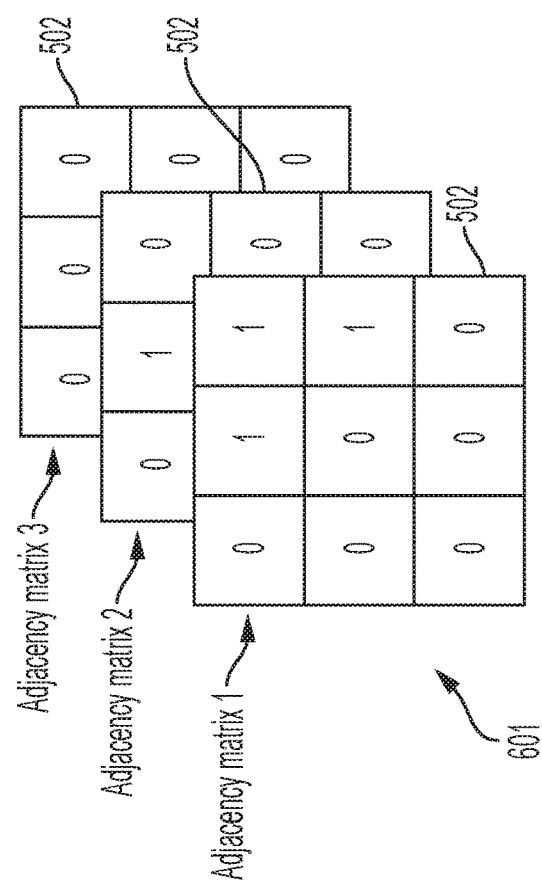
FIG. 6 is a diagram illustrating the stacking of adjacency matrices into an adjacency tensor in accordance with embodiments of the present invention.

With reference to FIGS. 6 and 7, as used herein, a tensor is a three-dimensional table. Thus, an adjacency tensor 601 can be obtained by stacking up the adjacency matrices 502 (see FIG. 6) and a feature tensor 701 can be obtained by stacking up the feature matrices 503 (see FIG. 7).

With reference to FIG. 8, the adjacency tensor 601 and the feature tensor 701 can be partitioned. Thus, some numbers of the adjacency matrices 502 or data of the adjacency tensor 601 can be partitioned into an adjacency training tensor 801 and an adjacency validation tensor 802 (e.g., an 80/20 ratio). Similarly, some numbers of the feature matrices 503 or data of the feature tensor 701 can be partitioned into a feature training tensor 803 and a feature validation tensor 804 (e.g., an 80/20 ratio).

The data of the adjacency training tensor 801 and the feature training tensor 803 are then used to develop an embedding model and then a prediction model. The embedding model allows for computation of an embedding of the data of the adjacency training tensor 801 and the feature training tensor 803. The prediction model allows for a prediction of various characteristics including, but not limited to, edge classification of a time-varying graph.

The embedding model is developed according to the following equation:

$$y = \mathcal{A} *_X * W$$

where the tensors A and X are the adjacency training tensor 801 and the feature training tensor 803, respectively, W is a tensor that includes first tunable parameters that are tunable during training, the star product is described in existing literature and refers to a generalized version of the t-product, commonly called the L-product or M-product, that is based on a convolution-like operation, and which can be implemented efficiently using a Fast Fourier Transform (FFT) in the special case of the t-product, and Y is an output tensor and includes the embedding of the data in the adjacency training tensor 801 and the feature training tensor 803.

The prediction model is developed according to the following equation:

$$p(m, n, t) \stackrel{def}{=} \text{softmax}(U[(Y \times_3 M)_{m:t}, (Y \times_3 M)_{n:t}]^T)$$

where the embedding Y is taken as an input to compute prediction p and U is a matrix of second tuned parameters that are tuned during training. That is, in an exemplary case, p(m, n, t) is a prediction that an edge in a time-varying graph at a future time t will extend from m to n or, in a case of a business network, if m sends bitcoins to n at time t, the prediction p(m, n, t) will suggest whether this is a trustworthy transaction or not.

The embedding model can be augmented by repeating the computation in many "layers". Between each layer, there is an "activation function" which modifies the input from the previous layer in some way. For example, a 2-layer embedding model would take the form of the following equation:

$$y = \mathcal{A} *_{\sigma_0}(\mathcal{A} *_X * W^{(0)}) * W^{(1)}$$

where the tensors A and X are the same as before, $W^{(0)}$ and $W^{(1)}$ are now two different parameter tensors with tunable weights which are tuned during training, and $\sigma_0$ is a function which applies some mathematical operation element-wise to its input. A standard choice for $\sigma_0$ in machine learning is the so called "ReLU" function, which modifies each tensor entry by setting it to zero if it is negative, and leaving it unchanged if it is positive (e.g., $\sigma_0$ (1.3)=1.3, $\sigma_0$ (0.7)=0.7, and $\sigma_0$ (−2.0)=0). A great variety of choices for $\sigma_0$ could be made.

As one further example, a 3-layer embedding model would look like the following equation:

$$y = \mathcal{A} *_{\sigma_1}(\mathcal{A} *_{\sigma_0}(\mathcal{A} *_X * W^{(0)}) * W^{(1)}) * W^{(2)}$$

where $\sigma_0$ and $\sigma_1$ may or may not be the same function.

A goal of adding more layers like this is to improve the performance of the predictive system. The output tensor Y is used as an input into the predictive model in exactly the same way as before, even when more layers are used to compute Y.

The embedding model and the prediction model can be iteratively updated based on how well the prediction matches true edge labels during training. This can be done by modifying the tensor W in the embedding model and the matrix U in the prediction model using, for example, a cross entropy loss function combined with gradient descent. After each update, the resulting embedding model and prediction model are stored. Once a predefined number of iterations are complete, the prediction p is computed for each stored embedding-prediction model pair using the data of the adjacency validation tensor 802 and the feature validation tensor 804 whereupon an optimized embedding-prediction model pair can be identified for yielding the best performance to complete the training.

Figure 9:
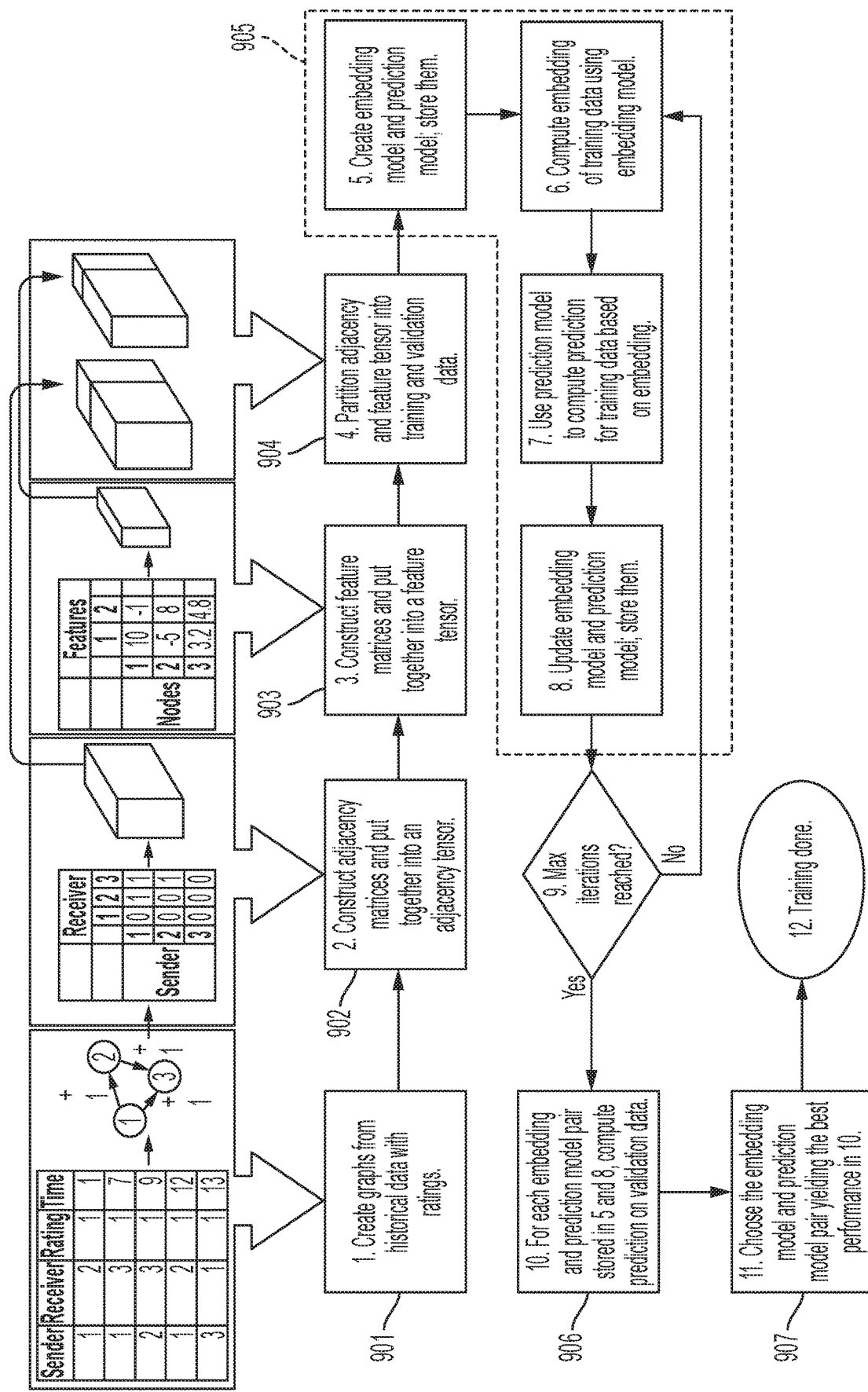
FIG. 9 is a flow diagram illustrating a method of analyzing time-varying graphs in accordance with embodiments of the present invention.

With reference to FIG. 9, the training operations described above together form a method of analyzing time-varying graphs respectively including nodes representing elements in a network, edges representing transactions between elements and data associated with the nodes and the edges. As shown in FIG. 9, the method includes creating time-varying graphs from historical data with ratings 901, constructing adjacency matrices describing each node and edge of each time-varying graph for stacking into an adjacency tensor 902 and constructing feature matrices describing the data of each time-varying graph for stacking into a feature tensor 903. The method further includes partitioning the adjacency and feature tensors into adjacency and feature training tensors and into adjacency and feature validation tensors, respectively 904. At this point, an embedding model is created for computing an embedding of data of the adjacency and feature training tensors and a prediction model is in turn created using the embedding of the data for computing a prediction 905. Next, the embedding and prediction models are validated using data of the adjacency and feature validation tensors 906 and an optimized embedding-prediction model pair is identified 907.

Figure 10:
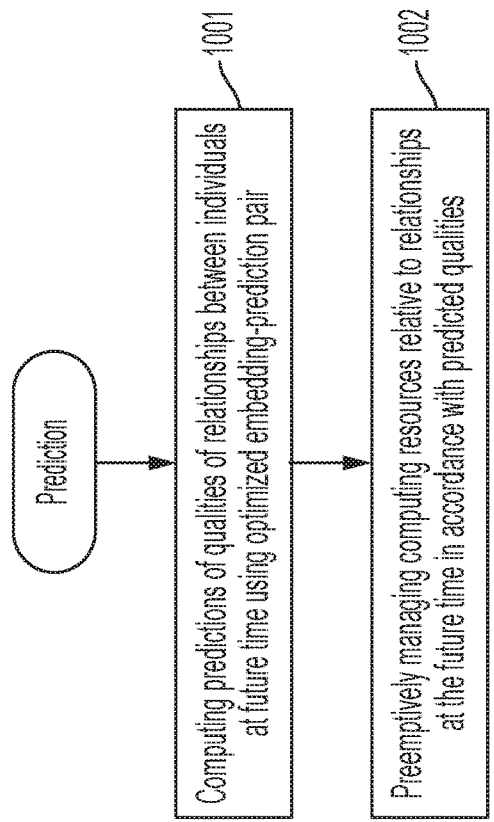
FIG. 10 is a flow diagram illustrating additional operations enabled by the method of analyzing time-varying graphs of FIG. 9 in accordance with embodiments of the present invention.

With reference to FIG. 10, where the network described by time-varying graphs includes a social network in which the nodes and the edges of each time-varying graph respectively represent individuals and relationships between the individuals, the prediction p of the optimized embedding-prediction model pair can include predicted qualities of the relationships between individuals of the social network at a future time. In this or other cases, the method of FIG. 9 can further include computing the predictions of qualities of relationships between the individuals at the future time using the optimized embedding-prediction pair 1001 and preemptively managing computing resources relative to the relationships at the future time in accordance with the predicted qualities 1002. Thus, a relationship between two individuals at the future time can be predicted to be characterized as a bullying relationship, for example, computing resources that would support such bullying (i.e., allowing mean-spirited content to be transmitted from one individual to another) can be restricted.

Figure 11:
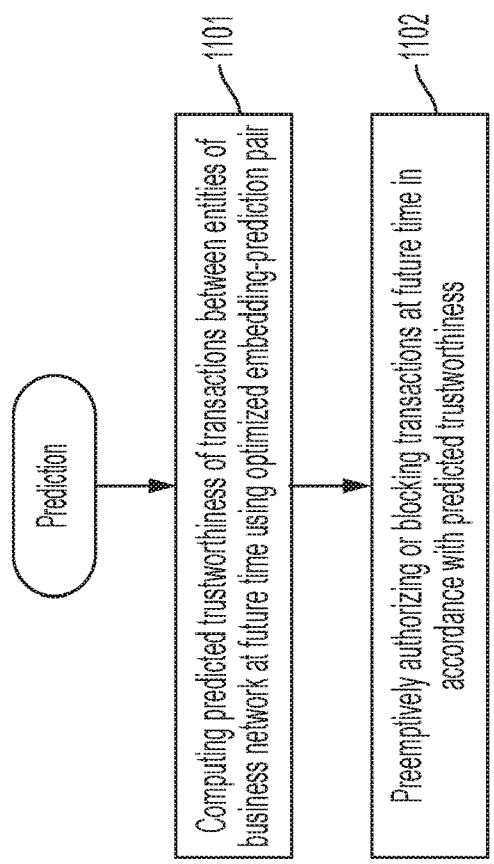
FIG. 11 is a flow diagram illustrating additional operations enabled by the method of analyzing time-varying graphs of FIG. 9 in accordance with embodiments of the present invention.

With reference to FIG. 11, where the network described by time-varying graphs includes a business network in which the nodes and the edges of each time-varying graph respectively represent entities and transactions between the entities, the prediction p of the optimized embedding-prediction model pair can include predicted trustworthiness of the transactions between the entities of the business network at a future time. In this or other cases, the method of FIG. 9 can further include computing the predicted trustworthiness of transactions between entities of the business network at the future time using the optimized embedding-prediction pair 1101 and preemptively authorizing or blocking the transactions at the future time in accordance with the predicted trustworthiness 1102. Thus, for a transaction between two entities at the future time that can be predicted to be characterized as untrustworthy, for example, computing resources can be engaged to block or place a warning on the transaction before it can be completed.

Figure 12:
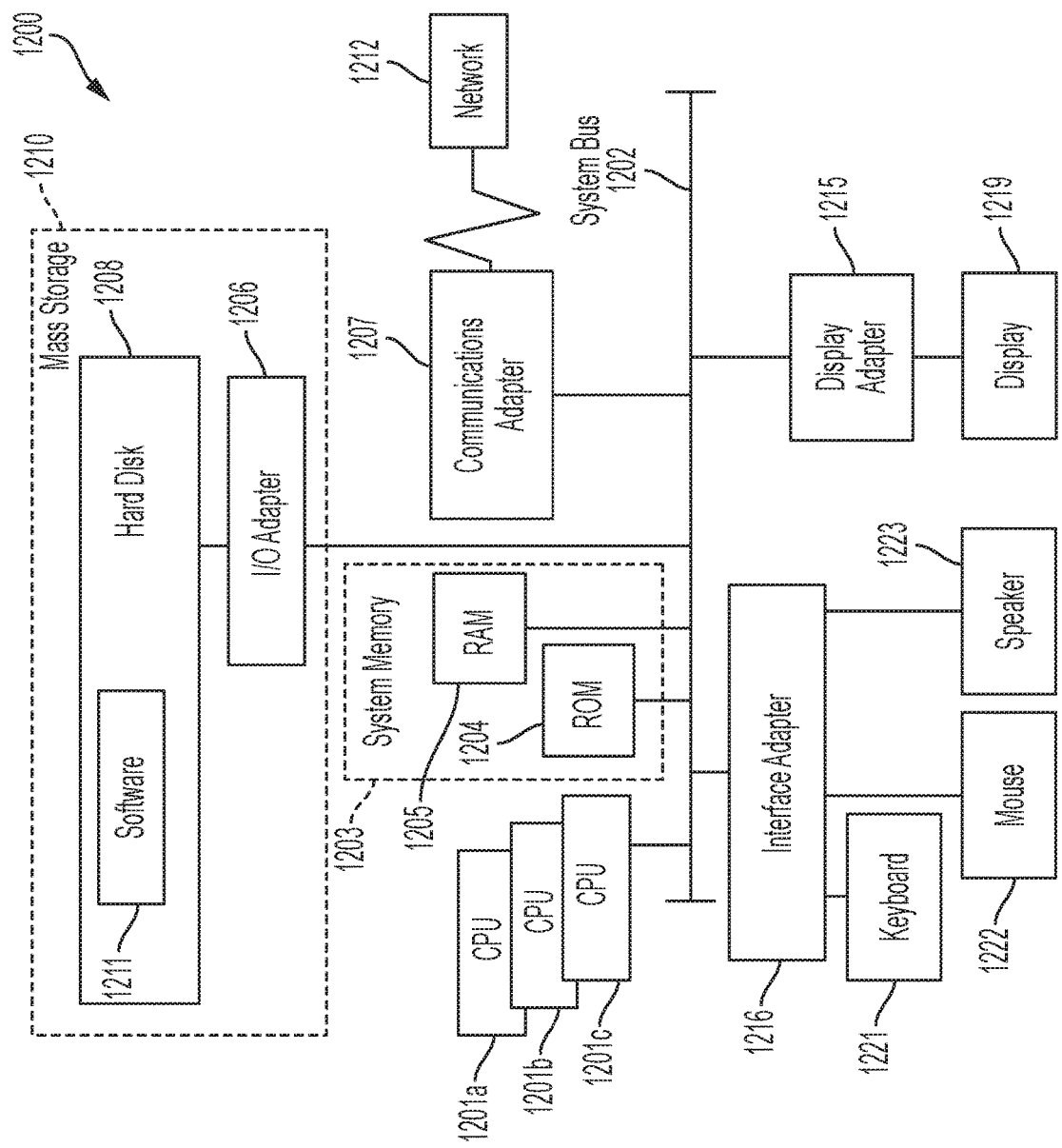
FIG. 12 depicts a computer system capable of implementing aspects of the present invention.

Turning now to FIG. 12, a computer system 1200 is generally shown in accordance with an embodiment and is configured for executing the methods described above. The computer system 1200 can be an electronic, computer framework comprising and/or employing any number and combination of computing devices and networks utilizing various communication technologies, as described herein. The computer system 1200 can be easily scalable, extensible, and modular, with the ability to change to different services or reconfigure some features independently of others. The computer system 1200 may be, for example, a server, desktop computer, laptop computer, tablet computer, or smartphone. In some examples, computer system 1200 may be a cloud computing node. Computer system 1200 may be described in the general context of computer system executable instructions, such as program modules, being executed by a computer system. Generally, program modules may include routines, programs, objects, components, logic, data structures, and so on that perform particular tasks or implement particular abstract data types. Computer system 1200 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 12, the computer system 1200 has one or more central processing units (CPU(s)) 1201a, 1201b, 1201c, etc. (collectively or generically referred to as processor(s) 1201). The processors 1201 can be a single-core processor, multi-core processor, computing cluster, or any number of other configurations. The processors 1201, also referred to as processing circuits, are coupled via a system bus 1202 to a system memory 1203 and various other components. The system memory 1203 can include a read only memory (ROM) 1204 and a random access memory (RAM) 1205. The ROM 1204 is coupled to the system bus 1202 and may include a basic input/output system (BIOS), which controls certain basic functions of the computer system 1200. The RAM is read-write memory coupled to the system bus 1202 for use by the processors 1201. The system memory 1203 provides temporary memory space for operations of said instructions during operation. The system memory 1203 can include random access memory (RAM), read only memory, flash memory, or any other suitable memory systems.

The computer system 1200 comprises an input/output (I/O) adapter 1206 and a communications adapter 1207 coupled to the system bus 1202. The I/O adapter 1206 may be a small computer system interface (SCSI) adapter that communicates with a hard disk 1208 and/or any other similar component. The I/O adapter 1206 and the hard disk 1208 are collectively referred to herein as a mass storage 1210.

Software 1211 for execution on the computer system 1200 may be stored in the mass storage 1210. The mass storage 1210 is an example of a tangible storage medium readable by the processors 1201, where the software 1211 is stored as instructions for execution by the processors 1201 to cause the computer system 1200 to operate, such as is described herein below with respect to the various Figures. Examples of computer program product and the execution of such instruction is discussed herein in more detail. The communications adapter 1207 interconnects the system bus 1202 with a network 1212, which may be an outside network, enabling the computer system 1200 to communicate with other such systems. In one embodiment, a portion of the system memory 1203 and the mass storage 1210 collectively store an operating system, which may be any appropriate operating system, such as the z/OS or AIX operating system from IBM Corporation, to coordinate the functions of the various components shown in FIG. 12.

Additional input/output devices are shown as connected to the system bus 1202 via a display adapter 1215 and an interface adapter 1216 and. In one embodiment, the adapters 1206, 1207, 1215, and 1216 may be connected to one or more I/O buses that are connected to the system bus 1202 via an intermediate bus bridge (not shown). A display 1219 (e.g., a screen or a display monitor) is connected to the system bus 1202 by a display adapter 1215, which may include a graphics controller to improve the performance of graphics intensive applications and a video controller. A keyboard 1221, a mouse 1222, a speaker 1223, etc. can be interconnected to the system bus 1202 via the interface adapter 1216, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 12, the computer system 1200 includes processing capability in the form of the processors 1201, and, storage capability including the system memory 1203 and the mass storage 1210, input means such as the keyboard 1221 and the mouse 1222, and output capability including the speaker 1223 and the display 1219.

In some embodiments, the communications adapter 1207 can transmit data using any suitable interface or protocol, such as the internet small computer system interface, among others. The network 1212 may be a cellular network, a radio network, a wide area network (WAN), a local area network (LAN), or the Internet, among others. An external computing device may connect to the computer system 1200 through the network 1212. In some examples, an external computing device may be an external webserver or a cloud computing node.

It is to be understood that the block diagram of FIG. 12 is not intended to indicate that the computer system 1200 is to include all of the components shown in FIG. 12. Rather, the computer system 1200 can include any appropriate fewer or additional components not illustrated in FIG. 12 (e.g., additional memory components, embedded controllers, modules, additional network interfaces, etc.). Further, the embodiments described herein with respect to computer system 1200 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for analyzing time-varying graphs respectively comprising nodes representing elements in a network, edges representing transactions between elements and data associated with the nodes and the edges, the computer-implemented method comprising:
constructing, using a processor, adjacency matrices describing each node and edge of each time-varying graph for stacking into an adjacency tensor;
constructing, using the processor, feature matrices describing the data of each time-varying graph for stacking into a feature tensor;
partitioning, using the processor, the adjacency and feature tensors into adjacency and feature training tensors and into adjacency and feature validation tensors, respectively;
creating, using the processor, an embedding model for computing an embedding of the adjacency and feature training tensors and a prediction model using the embedding for computing a prediction;
validating, using the processor, the embedding and prediction models using the adjacency and feature validation tensors to identify an optimized embedding-prediction model pair;
computing the predictions of qualities of relationships between the individuals at the future time using the optimized embedding-prediction pair; and
preemptively managing computing resources relative to the relationships at the future time in accordance with the predicted qualities.

2. The computer-implemented method according to claim 1, wherein:
the partitioning of the adjacency tensor comprises stacking a first portion of the adjacency matrices into an adjacency training tensor and a second portion of the adjacency matrices into an adjacency validation tensor, and
the partitioning of the feature tensor comprises stacking a first portion of the feature matrices into a feature training tensor and a second portion of the feature matrices into a feature validation tensor.

3. The computer-implemented method according to claim 1, wherein:
the embedding is a product of the adjacency and feature training tensors and a tuned parameter tensor with a non-linear activation function applied to entries,
the prediction takes the embedding as an input and uses a tuned parameter matrix,
the tuned parameter tensor and the tuned parameter matrix are iteratively tuned, and
the computer-implemented method further comprises updating the embedding and prediction models following each iteration.

4. The computer-implemented method according to claim 1, wherein:
the network comprises a social network in which the nodes and the edges of each time-varying graph respectively represent individuals and relationships between the individuals, and
the prediction of the optimized embedding-prediction model pair comprises predicted qualities of the relationships between individuals of the social network at a future time.

5. The computer-implemented method according to claim 1, wherein:
the network comprises a business network in which the nodes and the edges of each time-varying graph respectively represent entities and transactions between the entities, and
the prediction of the optimized embedding-prediction model pair comprises predicted trustworthiness of transactions between entities of the business network at a future time.

6. The computer-implemented method according to claim 5, further comprising:
computing the predicted trustworthiness of transactions between entities of the business network at the future time using the optimized embedding-prediction pair; and
preemptively authorizing or blocking the transactions at the future time in accordance with the predicted trustworthiness.

7. A method for analyzing time-varying graphs respectively comprising nodes representing elements in a network, edges representing transactions between elements and data associated with the nodes and the edges, the method comprising:
constructing adjacency matrices describing each node and edge of each time-varying graph for stacking into an adjacency tensor;
constructing feature matrices describing the data of each time-varying graph for stacking into a feature tensor;
partitioning the adjacency and feature tensors into adjacency and feature training tensors and into adjacency and feature validation tensors, respectively;
creating an embedding model for computing an embedding of the adjacency and feature training tensors and a prediction model using the embedding for computing a prediction;
validating the embedding and prediction models using the adjacency and feature validation tensors to identify an optimized embedding-prediction model pair;
computing the predictions of qualities of relationships between the individuals at the future time using the optimized embedding-prediction pair; and
preemptively managing computing resources relative to the relationships at the future time in accordance with the predicted qualities.

8. The method according to claim 7, wherein:
the partitioning of the adjacency tensor comprises stacking a first portion of the adjacency matrices into an adjacency training tensor and a second portion of the adjacency matrices into an adjacency validation tensor, and
the partitioning of the feature tensor comprises stacking a first portion of the feature matrices into a feature training tensor and a second portion of the feature matrices into a feature validation tensor.

9. The method according to claim 7, wherein:
the embedding is a product of the adjacency and feature training tensors and a tuned parameter tensor with a non-linear activation function applied to entries,
the prediction takes the embedding as an input and uses a tuned parameter matrix,
the tuned parameter tensor and the tuned parameter matrix are iteratively tuned, and the method further comprises updating the embedding and prediction models following each iteration.

10. The method according to claim 7, wherein:
the network comprises a social network in which the nodes and the edges of each time-varying graph respectively represent individuals and relationships between the individuals, and
the prediction of the optimized embedding-prediction model pair comprises predicted qualities of the relationships between individuals of the social network at a future time.

11. The method according to claim 10, wherein:
the network comprises a business network in which the nodes and the edges of each time-varying graph respectively represent entities and transactions between the entities, and
the prediction of the optimized embedding-prediction model pair comprises predicted trustworthiness of transactions between entities of the business network at a future time.

12. The method according to claim 11, further comprising:
computing the predicted trustworthiness of transactions between entities of the business network at the future time using the optimized embedding-prediction pair; and
preemptively authorizing or blocking the transactions at the future time in accordance with the predicted trustworthiness.

13. A computer program product, comprising a computer readable storage medium having program instructions embodied therewith, the program instructions executable by a processor to cause the processor to perform a method of analyzing time-varying graphs respectively comprising nodes representing elements in a network, edges representing transactions between elements and data associated with the nodes and the edges, the method comprising:
constructing adjacency matrices describing each node and edge of each time-varying graph for stacking into an adjacency tensor;
constructing feature matrices describing the data of each time-varying graph for stacking into a feature tensor;
partitioning the adjacency and feature tensors into adjacency and feature training tensors and into adjacency and feature validation tensors, respectively;
creating an embedding model for computing an embedding of the adjacency and feature training tensors and a prediction model using the embedding for computing a prediction; and
validating the embedding and prediction models using the adjacency and feature validation tensors to identify an optimized embedding-prediction model pair;
computing the predictions of qualities of relationships between the individuals at the future time using the optimized embedding-prediction pair; and
preemptively managing computing resources relative to the relationships at the future time in accordance with the predicted qualities.

14. The computer program product according to claim 13, wherein:
the partitioning of the adjacency tensor comprises stacking a first portion of the adjacency matrices into an adjacency training tensor and a second portion of the adjacency matrices into an adjacency validation tensor, and
the partitioning of the feature tensor comprises stacking a first portion of the feature matrices into a feature training tensor and a second portion of the feature matrices into a feature validation tensor.

15. The computer program product according to claim 13, wherein:
the embedding is a product of the adjacency and feature training tensors and a tuned parameter tensor with a non-linear activation function applied to entries,
the prediction takes the embedding as an input and uses a tuned parameter matrix,
the tuned parameter tensor and the tuned parameter matrix are iteratively tuned, and
the method further comprises updating the embedding and prediction models following each iteration.

16. The computer program product according to claim 13, wherein:
the network comprises a social network in which the nodes and the edges of each time-varying graph respectively represent individuals and relationships between the individuals, and
the prediction of the optimized embedding-prediction model pair comprises predicted qualities of the relationships between individuals of the social network at a future time.

17. The computer program product according to claim 13, wherein:
the network comprises a business network in which the nodes and the edges of each time-varying graph respectively represent entities and transactions between the entities, and
the prediction of the optimized embedding-prediction model pair comprises predicted trustworthiness of transactions between entities of the business network at a future time.

18. The computer program product according to claim 17, further comprising:
computing the predicted trustworthiness of transactions between entities of the business network at the future time using the optimized embedding-prediction pair; and
preemptively authorizing or blocking the transactions at the future time in accordance with the predicted trustworthiness.

19. A method for analyzing time-varying graphs respectively comprising nodes representing individuals in a social network, edges representing friendships between individuals and data associated with the nodes and the edges, the method comprising:
constructing, using a processor, adjacency and feature matrices describing each node and edge of each time-varying graph for stacking into an adjacency tensor and describing the data of each time-varying graph for stacking into a feature tensor, respectively;
partitioning, using the processor, the adjacency and feature tensors into adjacency and feature training tensors and into adjacency and feature validation tensors, respectively;
creating, using the processor, an embedding model for computing an embedding of the adjacency and feature training tensors and a prediction model using the embedding for computing predictions of qualities of relationships between the individuals at a future time;
validating, using the processor, the embedding and prediction models using the adjacency and feature validation tensors to identify an optimized embedding-prediction model pair;

computing, using the processor, the predictions of qualities of relationships between the individuals at the future time using the optimized embedding-prediction pair; and preemptively managing, using the processor, computing resources relative to the relationships at the future time in accordance with the predicted qualities.

20. The computer-implemented method according to claim 19, wherein:

the embedding is a product of the adjacency and feature training tensors and a tuned parameter tensor with a non-linear activation function applied to entries, the prediction takes the embedding as an input and uses a tuned parameter matrix, the tuned parameter tensor and the tuned parameter matrix are iteratively tuned, and the computer-implemented method further comprises updating the embedding and prediction models following each iteration.

21. A method for analyzing time-varying graphs respectively comprising nodes representing entities in a business network, edges representing transactions between entities and data associated with the nodes and the edges, the method comprising:

constructing, using a processor, adjacency and feature matrices describing each node and edge of each time-varying graph for stacking into an adjacency tensor and describing the data of each time-varying graph for stacking into a feature tensor, respectively;

partitioning, using the processor, the adjacency and feature tensors into adjacency and feature training tensors and into adjacency and feature validation tensors, respectively;

creating, using the processor, an embedding model for computing an embedding of the adjacency and feature training tensors and a prediction model using the embedding for computing predictions of qualities of relationships between the individuals at a future time;

validating, using the processor, the embedding and prediction models using the adjacency and feature validation tensors to identify an optimized embedding-prediction model pair;

computing, using the processor, the predicted trustworthiness of transactions between entities at the future time using the optimized embedding-prediction pair; and preemptively authorizing, using the processor, or blocking the transactions at the future time in accordance with the predicted trustworthiness.

22. The computer-implemented method according to claim 21, wherein:

the embedding is a product of the adjacency and feature training tensors and a tuned parameter tensor with a non-linear activation function applied to entries, the prediction takes the embedding as an input and uses a tuned parameter matrix, the tuned parameter tensor and the tuned parameter matrix are iteratively tuned, and the computer-implemented method further comprises updating the embedding and prediction models following each iteration.

* * * * *